United States Patent
Chen et al.

(10) Patent No.: US 8,147,996 B2
(45) Date of Patent: Apr. 3, 2012

(54) PERPENDICULAR MEDIA WITH DUAL SOFT MAGNETIC LAYERS

(75) Inventors: Qixu Chen, Milpitas, CA (US); Charles Frederick Brucker, Pleasanton, CA (US); Chung-Hee Chang, Fremont, CA (US); Thomas Patrick Nolan, Fremont, CA (US); Samuel Dacke Harkness, IV, Berkeley, CA (US)

(73) Assignee: Seagate Technology LLC, Cupertino, CA (US)

( * ) Notice: Subject to any disclaimer, the term of this patent is extended or adjusted under 35 U.S.C. 154(b) by 919 days.

(21) Appl. No.: 11/145,938

(22) Filed: Jun. 7, 2005

(65) Prior Publication Data

US 2006/0275628 A1 Dec. 7, 2006

(51) Int. Cl.
*G11B 5/66* (2006.01)
(52) U.S. Cl. .............. 428/828.1; 428/800; 428/826; 428/827; 428/828

(58) Field of Classification Search .................. None
See application file for complete search history.

(56) References Cited

U.S. PATENT DOCUMENTS

| | | | | |
|---|---|---|---|---|
| 4,747,888 A | * | 5/1988 | Takino et al. ............... | 148/304 |
| 5,242,762 A | * | 9/1993 | Kouchiyama .............. | 428/836.1 |
| 6,709,773 B1 | * | 3/2004 | Chang et al. ............... | 428/831 |
| 6,914,749 B2 | * | 7/2005 | Chang et al. ............... | 360/135 |
| 7,060,376 B1 | * | 6/2006 | Chang et al. ............... | 428/832 |
| 7,166,376 B2 | * | 1/2007 | Hikosaka et al. ........... | 428/829 |
| 7,235,314 B2 | * | 6/2007 | Chen et al. ................. | 428/831 |
| 2004/0247945 A1 | * | 12/2004 | Chen et al. ............. | 428/694 TS |

* cited by examiner

*Primary Examiner* — Mark Ruthkosky
*Assistant Examiner* — Gary Harris
(74) *Attorney, Agent, or Firm* — Hollingsworth & Funk, LLC

(57) ABSTRACT

A recording medium having a substrate, a first soft magnetic underlayer, a second soft magnetic underlayer and a perpendicular magnetic recording layer without a spacer layer between the first and second soft magnetic underlayers is disclosed.

24 Claims, 5 Drawing Sheets

Protective Layer 16

Magnetic recording layer 15

Non-magnetic intermediate layer 14 (optional)

Seed layer 17 (optional)

Second soft magnetic underlayer 13

First soft magnetic underlayer 12

Adhesion layer 11 (optional)

Substrate 10

Longitudinal Recording Bits

Perpendicular Recording Bits

PERPENDICULAR MEDIA WITH DUAL SOFT MAGNETIC LAYERS

FIELD OF INVENTION

This invention relates to perpendicular recording media, such as thin film magnetic recording disks having perpendicular magnetic anisotropy, and to a method of manufacturing the media. The embodiments of the invention have particular applicability to perpendicular media having first and second magnetic underlayers (SUL) without a spacer layer between the two layers of the dual SUL or between laminations of the SUL.

BACKGROUND

Perpendicular magnetic recording systems have been developed for use in computer hard disc drives to provide higher liner density than longitudinal recording. FIG. 1, obtained from *Magnetic Disk Drive Technology* by Kanu G. Ashar, 322 (1997), shows magnetic bits and transitions in longitudinal and perpendicular recording. In a longitudinal recording there exists a demagnetization field between two magnetic bits. These demagnetization fields tend to separate bits, making transition space between bits, that is, transition parameter a, large as shown in FIG. 1 (*a*). At very high bit densities, the limiting parameter may be the length of the transition region. Perpendicular recording bits do not face each other, and hence they can be written at closed distances as shown in FIG. 1 (*b*).

A typical perpendicular recording head includes a trailing write pole, a leading return or opposing pole magnetically coupled to the write pole, and an electrically conductive magnetizing coil surrounding the yoke of the write pole as shown in FIG. 2, *Magnetic Disk Drive Technology* by Kanu G. Ashar, 323 (1997). The ring-type head shown in FIG. 2 is generally not used for perpendicular recording anymore. The writer portion of the head is still being used, but the reader portion is not. Perpendicular recording media may include magnetic media and an underlayer as shown in FIG. 2. The magnetic media could be a hard magnetic recording layer with vertically oriented magnetic moment and the underlayer could be a soft magnetic underlayer to enhance the recording head fields and provide a flux path from the trailing write pole to the leading or opposing pole of the writer. The magnetic flux passes from the write pole tip, through the hard magnetic recording track, into the soft magnetic underlayer, and across to the opposing pole. Such perpendicular recording media may also include a thin interlayer between the hard recording layer and the soft magnetic underlayer to prevent exchange coupling between the hard and soft layers. The soft magnetic underlayer helps also during the read operation. During the read back process, the soft magnetic underlayer produces the image of magnetic charges in the magnetically hard layer, effectively increasing the magnetic flux coming from the medium. This provides a higher playback signal.

The soft magnetic underlayer is located below a recording layer and alters the flux path from the recording head main pole to the return pole. For a thick, high permeability SUL, the altered flux path is similar to that which would result from placing a mirror image of the recording head below the SUL surface. Thus, the net recording field at the hard magnetic recording layer becomes fairly large compared to the field generated in the case of longitudinal recording. Magnetic flux flows from head through the SUL to return pole crossing twice through the recording layer. The quality of the image, and therefore the effectiveness of the soft magnetic underlayer, depends upon the permeability of the soft magnetic underlayer.

Conventional perpendicular magnetic recording media comprise magnetic SUL, seed layers, HCP (Hexagonal Close Packed)-structured interlayers, Co-based magnetic recording layers, and carbon overcoat. The SUL has significant effect on the crystallographic orientations of the recording layers. Some typical materials used as SUL such as $FeCo_{30.5}B_{12.8}$, feature high saturation induction, Bs, moderate magnetic permeability, μ, and provide an appropriate template for the seed layers, interlayers, and recording layers to grow on. The magnetic performance and crystallographic structure of the media with such SUL are generally reasonable. However, media yields often suffer due to a higher incidence of target spitting. Also, in order to suppress stripe domain formation in SULs featuring high magnetostriction constant, including FeCoB, a laminated SUL structure with spacer layers, such as Ta, could be interposed between critically thin soft layers. The medium is sputter-deposited under room temperature, which is the typical process temperature for granular recording media. Each spacer layer needs one deposition chamber and requires an additional deposition step. It is therefore advantageous to have a perpendicular recording medium without a spacer layer between SUL laminations or to eliminate the need for lamination by the use of appropriate SUL materials that suppress stripe domain.

SUMMARY OF THE INVENTION

Some embodiments of this invention show that the SUL not only provides the path for the return of magnetic flux to the writer head, but also affects the crystallographic orientation of the HCP-structured interlayer and magnetic recording layers. The hard magnetic recording layer crystallographic orientation depends more strongly upon the top portion of the SUL. In order to provide a high permeability path for the magnetic flux to be returned to the writer head, the product of the saturation magnetic induction, Bs, and the thickness of SUL, t, could be more than certain minimum value, for instance, 0.001 Gauss*meter.

Besides satisfying the requirement on Bs, μ, corrosion resistance of the SUL, according to embodiment of the invention, the top SUL is selected for providing good crystallographic orientation of the interlayer and magnetic recording layers, and the bottom SUL is selected to have low magnetostriction constant to make a thick enough SUL to satisfy the requirement on Bst of SUL. The dual SUL also enables removal of spacer layers between laminated dual SUL structures in the prior art. The dual SUL of the invention also enables use (as a first SUL) of a class of SUL materials that have many desirable properties, but do not provide good hard magnetic recording layer orientation when used as a single or top layer (second) SUL. The bottom SUL is selected also to have less chance of target spitting (defect formation on the discs) to improve the glide yield of the media with or without spacer layers.

By employing SUL with two or more kinds of materials, the effective permeability of the SUL can be tailored to a suitable value by adjusting the thickness ratio of the component SUL materials.

The embodiments of the invention are directed to a perpendicular recording medium having a SUL structure, which provides the perpendicular magnetic recording media with good magnetic performances and reduced yield loss due to spitting. The SUL structure in one embodiment does not need a spacer layer between the layers of the SUL structure.

One embodiment of this invention relates to a perpendicular recording medium, comprising a substrate, a first soft magnetic underlayer, a second soft magnetic underlayer and a magnetic recording layer without a spacer layer between the first and second soft magnetic underlayers, preferably wherein the first and second magnetic underlayers contain substantially no stripe domains and the combined Bst of the first soft magnetic underlayer and the second soft magnetic underlayer is greater than 0.002 Gauss*Meter.

Another embodiment relates to a method of manufacturing a perpendicular recording medium, comprising obtaining a substrate, depositing a first soft magnetic underlayer, depositing a second soft magnetic underlayer and depositing a magnetic recording layer without a spacer layer between the first and second soft magnetic underlayers.

Yet another embodiment relates to a perpendicular recording medium, comprising a substrate, a first soft magnetic underlayer, a second soft magnetic underlayer and a magnetic recording layer, wherein the first soft magnetic underlayer comprises a material with an absolute value of magnetostriction constant of less than $5*10^{-6}$, wherein the material is selected from the group consisting of CoZrNb, CoZrTa, and combinations thereof, preferably wherein the magnetic recording layer has a growth direction with less than 4° FWHM of XRD rocking curves around (0002) peaks.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

The embodiments of the invention provide a perpendicular recording medium that could have ferromagnetic and antiferromagnetic coupling in a soft magnetic underlayer of the perpendicular recording medium. The embodiments of the invention are particularly suitable for use with a magnetic disc storage system with a recording head having a head capable of performing read and write operations. Antiferromagnetic coupling generally refers to the coupling between ferromagnetic layers or multilayer structures such that adjacent ferromagnetic layers or multilayer structures have magnetizations that point in generally opposite directions. Ferromagnetic coupling generally refers to indirect coupling between ferromagnetic layers or multilayer structures such that adjacent ferromagnetic layers or multilayer structures have magnetizations that point in generally the same directions.

Figure 1A:
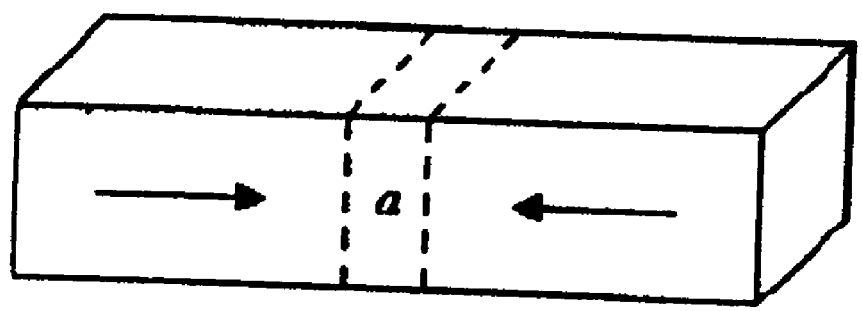
FIG. 1(a) shows longitudinal recording bits.
Figure 1B:
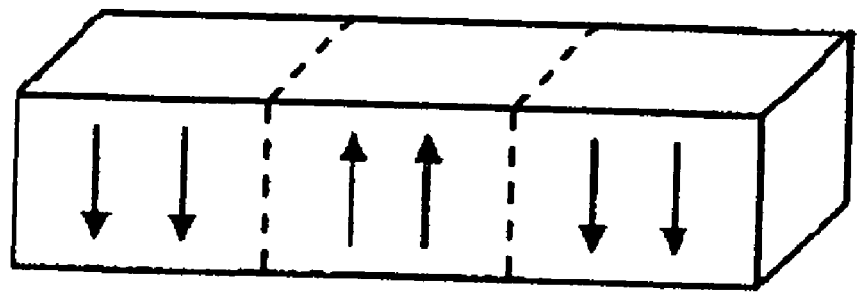
FIG. 1(b) shows perpendicular recording bits.
Figure 2:
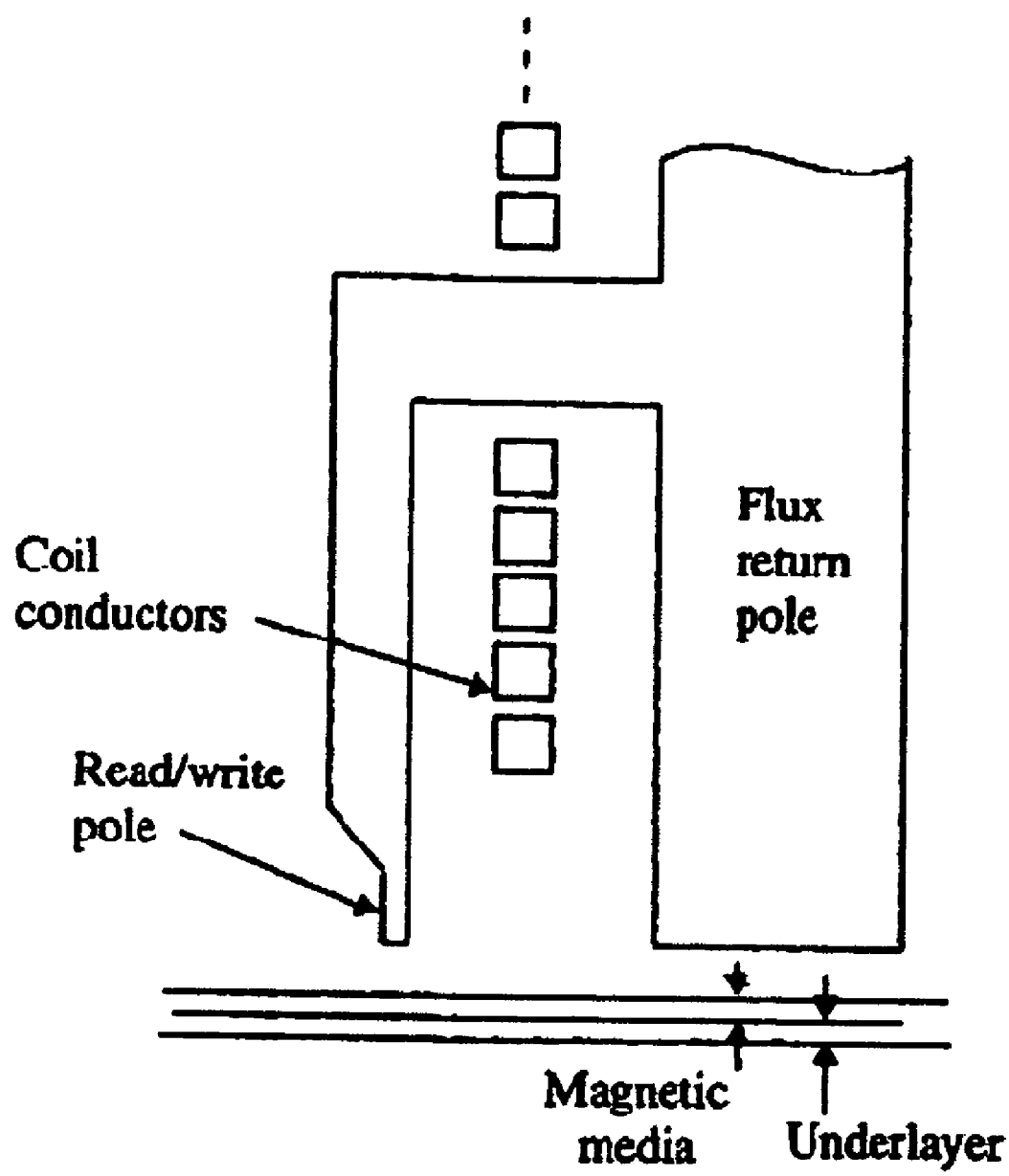
FIG. 2 perpendicular pole head with magnetic media and underlayer.
Figure 3:
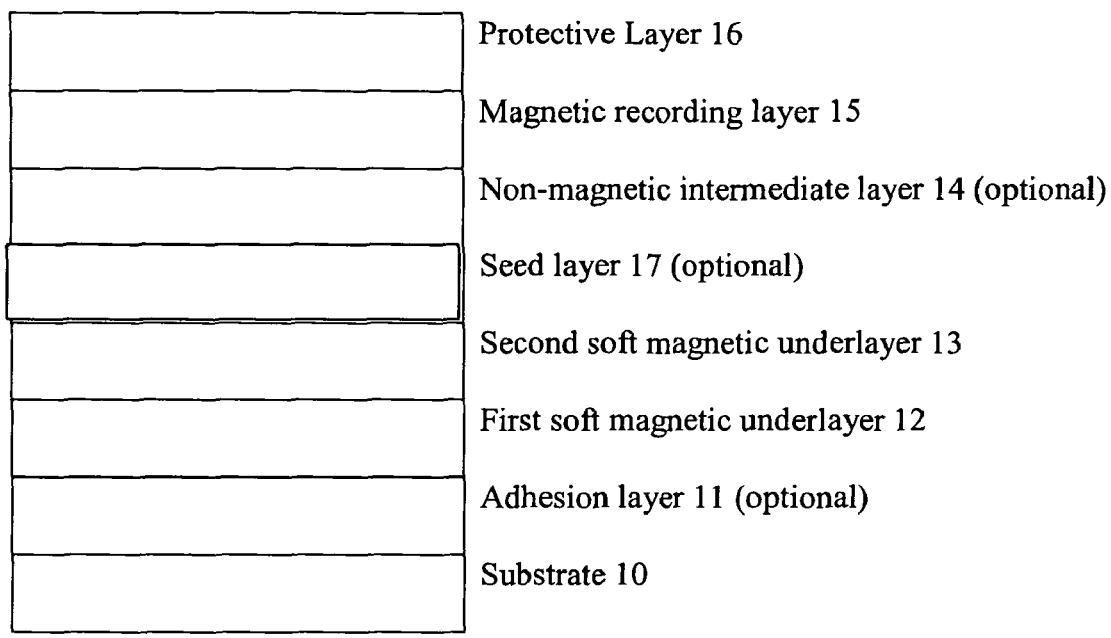
FIG. 3 is a schematic of an embodiment of a perpendicular recording medium of this invention.

A preferred embodiment of a perpendicular recording medium of this invention is shown in FIG. 3. The adhesion layer 11 is about 2.5 to 4.0 nm. The thickness of seedlayer 17 is about 1 to 5 nm, preferably, about 1.5 to 3 nm. The total thicknesses of the first and second soft magnetic underlayers 12 and 13 are preferably greater than 50 nm, more preferably, about 100 to 200 nm, and the thickness of magnetic recording layer 15 deposited on the underlayer is about 7 to 20 nm. There is no spacer layer between the first and second soft magnetic underlayers. In between the second amorphous soft magnetic underlayer 13 and the magnetic recording layer 15 could be an interlayer 14 of thickness of about 5 to 35 nm. Protective layer 16 typically covers the magnetic recording layer 15.

The embodiments of the invention provide magnetic recording media suitable for high areal recording density exhibiting high SMNR. The embodiments of the invention achieve such technological advantages by forming a soft magnetic underlayer. A "soft magnetic material" is a material that is easily magnetized and demagnetized. As compared to a soft magnetic material, a "hard magnetic" material is one that neither magnetizes nor demagnetizes easily.

The underlayer is "soft" because it is made up of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft magnetic underlayer" of the embodiments of the invention encompasses nanocrystallites in amorphous phase or any other form of a material that exhibits no predominant sharp peak in an X-ray diffraction pattern as compared to background noise.

When soft magnetic underlayers are fabricated by magnetron sputtering on disk substrates, there are several components competing to determine the net anisotropy of the underlayers: effect of magnetron field, magnetostriction of film, stress originated from substrate shape and topography, thermal expansion coefficients, etc. The first and second soft magnetic underlayers can be fabricated as single layers or multilayers.

The soft magnetic underlayer could be deposited from targets manufactured by a gas atomized, alloyed powder process (AP) or by a molten material casting into a mold at a temperature between 1200 to 1550° C., and solidifying into an ingot. The ingot could then pre-heated to a temperature between 850 and 1200° C. in an annealing furnace suitable for rolling to desired thickness for final machining to precise target size.

An adhesion layer is a layer lying in between the substrate and the underlayer. Proper adhesion layer can also control anisotropy of the soft magnetic underlayer by promoting microstructure that exhibit either short-range ordering under the influence of magnetron field or different magnetostriction. An adhesion layer could also alter local stresses in the soft magnetic underlayer.

Preferably, in the soft magnetic underlayer of the perpendicular recording medium of the embodiments of the invention, an easy axis of magnetization is directed in a direction substantially transverse to a traveling direction of the magnetic head. This means that the easy axis of magnetization is directed more toward a direction transverse to the traveling direction of the read-write head than toward the traveling direction. Also, preferably, the underlayer of the perpendicular recording medium has a substantially radial or transverse anisotropy, which means that the magnetization in the soft magnetic material of the underlayer are directed more toward a direction transverse to the traveling direction of the read-write head when there is no external magnetic field applied to the SUL than toward the traveling direction.

Typically, when a magnetic recording medium is a tape, the tape travels and the head is stationary. Therefore, a traveling direction of the magnetic head of a stationary head of a recording device in which the magnetic recording tape moves is the direction in which the head "travels" spatially with respect to the magnetic recording tape.

In accordance with embodiments of this invention, the substrates that may be used in the embodiments of the invention include glass, glass-ceramic, aluminum/NiP, metal alloys, plastic/polymer material, ceramic, glass-polymer, composite materials or other non-magnetic materials. Glasses and glass-ceramics generally exhibit high resistance to shock.

A preferred embodiment of this invention is a perpendicular recording medium comprising at least two amorphous soft magnetic underlayers without a spacer layer between the laminations of the underlayers. The amorphous soft magnetic underlayer should preferably be made of soft magnetic materials and the recording layer should preferably be made of hard magnetic materials. The amorphous soft magnetic underlayer is relatively thick compared to other layers. A layer between the amorphous soft magnetic underlayer and the recording layer is called an interlayer or an intermediate layer. An interlayer can be made of more than one layer of non-magnetic materials. The purpose of the interlayer is to prevent an interaction between the amorphous soft magnetic underlayer and recording layer. An interlayer could also promote the desired properties of the recording layer. Longitudinal recording media do not have an amorphous soft magnetic underlayer. Therefore, the layers named as "underlayer" of longitudinal media are somewhat equivalent to the intermediate layer(s) of perpendicular media.

In the first and second magnetic underlayers structure according to the embodiments of the invention, both layers should preferably have suitable soft magnetic properties, such as high saturation flux density, Bs (>600 emu/cc), and high magnetic permeability, $\mu$ (>100). The top SUL should provide suitable surface topographic property, chemistry, and crystallographic property for the seed layers, interlayers and recording layers to grow on. FeCoB is a suitable top soft magnetic underlayer material.

One embodiment of this invention allows the use of a reduced number of layers. Compare for example FeCoB/Ta/FeCoB, CZN/Ta/CZN, CZN/Ta/FeCoB to CZN/FeCoB in the table below. In particular, this embodiment could allow the use of no spacer layer between the first SUL and the second SUL.

Another embodiment of this invention has a first SUL with low magnetostriction, no stripes, high Bst, high yield, and the second SUL could be relatively thin to avoid stripes and limit yield loss. The second SUL could provide a template for oriented the magnetic recording layer such that the magnetic recording layer has less than 4°, more preferred, less than 3.5°, most preferred, less than 3° of FWHM of XRD rocking curves around (0002) peaks. An example of this embodiment is CZN/FeCoB compared to FeCoB striped or CZN in tables below. The bottom SUL features less defect formation, resulting in fewer defects in the films due to target spitting etc. and/or does not need a spacer layer between layers that form the bottom SUL, if the bottom SUL is made up of multiple layers, and/or between the bottom and the top soft magnetic underlayers. Some of the SUL structure comprises spacer layers to have a laminated structure with spacer layers between the SUL laminations. When the thickness of some SUL materials, for instance, SUL materials with large magnetostriction constant, is more than a critical thickness, stripe domains will form in the SUL. The SUL with spacer layers can have total thickness more than the critical thickness for the formation of stripe domains of single SUL. The spacer layers prevent the build up of high stress levels in the SUL. Spacer layers can be used for other purposes also. The spacer layer used here is non-magnetic, and does not provide antiferromagnetic coupling between the underlayers adjacent to the spacer layers. The thickness of spacer layers is 0.5 to 5 nm. In Tables I and II, Ta layers are used as spacer layers. The soft magnetic materials with low magnetostriction constant are the preferred candidates for the bottom SUL and can be used for SUL without lamination. $CoZr_5Nb_4$ in the thickness range of 80 to 300 nm is an example for the bottom SUL.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

A adhesion layer, which could be optionally added as a layer lying in between the substrate and the soft magnetic underlayer, can enhance the adhesion of the SUL to the substrates and often control anisotropy of the soft magnetic underlayer by promoting a microstructure that exhibits either short-range ordering under the influence of a magnetron field or different magnetostriction. An adhesion layer could also alter local stresses in the soft magnetic underlayer.

Amorphous soft magnetic underlayers could produce smoother surfaces as compared to polycrystalline underlayers and additionally may improve the crystallographic orientations of the HCP-structured interlayers and hard magnetic recording layers. Therefore, amorphous soft magnetic underlayer could be one way of improving the crystallographic and magnetic properties of the magnetic recording media for high-density perpendicular magnetic recording. The amorphous soft magnetic underlayer materials include CoZrNb, CoZrTa, a Cr-doped or non-doped Fe-alloy-containing underlayer, wherein the Fe-alloy could be FeTaC, CoFeZr, CoFeTa, FeCoZrB, FeCoC, FeCoTaZr and FeCoB.

Another advantage of amorphous materials as soft magnetic underlayer materials is the lack of long-range order in the amorphous material. Without a long-range order, amorphous alloys have substantially lower magnetocrystalline anisotropy. The use of amorphous soft magnetic underlayer could be one way of reducing noise caused by ripple domains and surface roughness. The average surface roughness Ra of the amorphous soft magnetic underlayer is preferably below 0.4 nm, more preferably below 0.3 nm, and most preferably below 0.2 nm as measured by high resolution Atomic Force Microscopy (AFM).

In accordance with the embodiments of the invention, if a particular test method has not been explicitly stated to determine a parameter, then a conventional method used by persons of ordinary skill in this art could be used to determine that parameter.

In the embodiments of this invention, the preferred range of the absolute value of magnetostriction constant of the first SUL is $<5*10^{-6}$.

In the embodiments of this invention, the preferred range of coercivity of the magnetic recording media is 3000 to 8000 Oe, more preferably, 4500 to 6500 Oe.

The advantageous characteristics attainable by the embodiments of the invention are illustrated in the following examples.

EXAMPLES

All samples described in this disclosure were fabricated with DC magnetron sputtering except carbon films were made with ion beam deposition.

Table I shows glide yield of media of 3 nm Cr/SUL/1.5 nm Cu/18 nm RuCr/12.8 nm CoPtTiO/4.5 nm carbon. All media were fabricated under otherwise identical conditions except the soft magnetic underlayer structure. Each lamination of FeCoB and CoZrNb has thickness of 80 nm and 90 nm respectively except for the thickness specified on the table. Table I demonstrates that the perpendicular media with FeCoB SUL have much lower glide yield than that of the media with CoZrNb media.

TABLE I

Glide yield of perpendicular media with different soft magnetic underlayers.

| SUL type | FeCoB and FeCoBOx total thickness (nm) | CoZrNb and CoZrNbOx total thickness (nm) | Amount of discs for glide test | Amount of glide-passed discs | Yield (%) |
|---|---|---|---|---|---|
| [CoZrNbOx]$_3$/CoZrNb | 0 | 360 | 26 | 18 | 69 |
| [FeCoBOx/Ta]$_2$/FeCoB | 240 | 0 | 34 | 9 | 26 |
| [CoZrNbOx]$_2$/CoZrNb/Ta/FeCoB | 54 | 270 | 22 | 15 | 68 |

Table I shows that the media with the SUL comprised with thick CoZrNb and thin FeCoB have glide yield similar to that of pure CoZrNb. The letters Ox in the CoZrNbOx and FeCoBOx represent that the surfaces of CoZrNb and FeCoB were exposed to oxygen immediately subsequent to deposition. In the laminated structure having Ta in Table I, Ta is a spacer layer. Note the high yield of the SUL with less thickness of FeCoB, which is a material showing relatively higher incidence of defect formation.

Table II shows coercivity and FWHM (Full Width at Half Maximum) of XRD (X-ray Diffraction) rocking curves around (0002) peaks of RuCr/Co-alloy of the media with various SUL. All the media comprise 3 nm Cr/SUL/1.5 nm Cu/18 nm RuCr/12.8 nm CoPtTiO/4.5 nm carbon deposited on Al/NiP substrates and fabricated under otherwise identical conditions except the soft magnetic underlayer structure. The coercivity of these media varies slightly. The crystallographic orientations of these media vary significantly. The media with CoZrNb SUL have much wider FWHM than the media with FeCoB SUL. The media with thick CoZrNb and thin FeCoB at the top of the SUL have similar or narrower FWHM, which is desirable, than that of media with FeCoB SUL. Note that Samples D to F have spacer layers, but Sample F does not. In Sample E, the Ta layer is a spacer layer.

Figure 4:
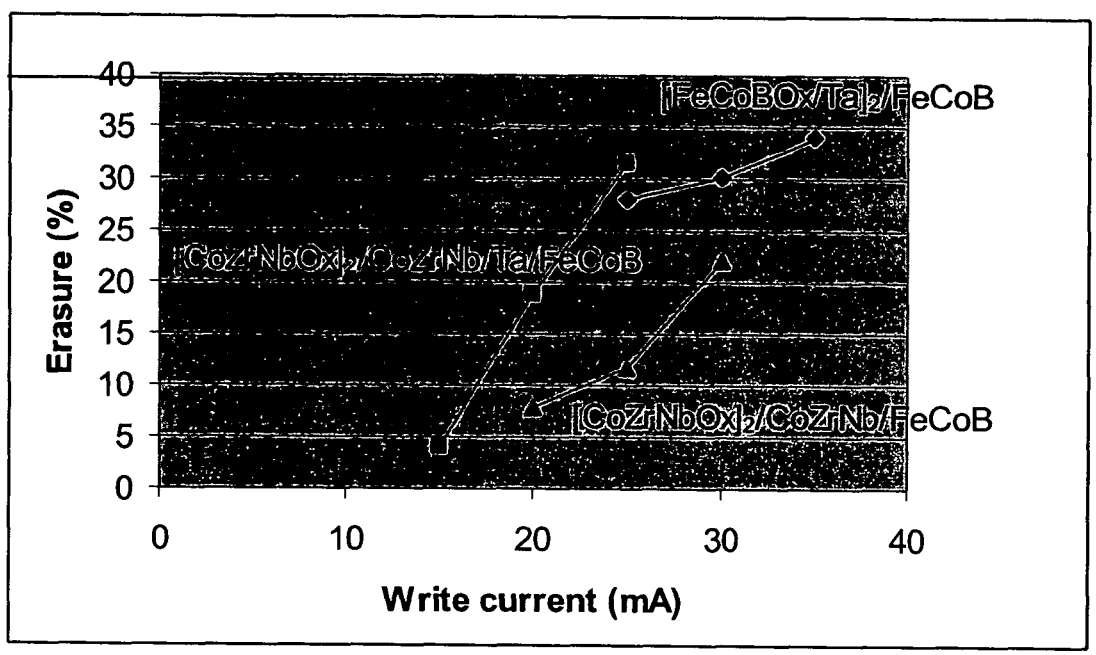
FIG. 4 shows erasure of media with three kinds of SUL of samples D, E, and F, listed on Table II.

FIG. 4 shows erasure of media D, E, and F listed on table II tested under various write current. Recording test shows that these three kinds of media have similar signal-to-noise ratio. The media with dual SUL according to the embodiments of the invention can have better/lower erasure than that of the media with single alloy FeCoB SUL.

Figure 5:
FIG. 5 shows optical HDI images of samples C (top), D (Middle) and F (bottom) on table II measured with p-polar channel and in phase mode display range 10.
Figure 5:
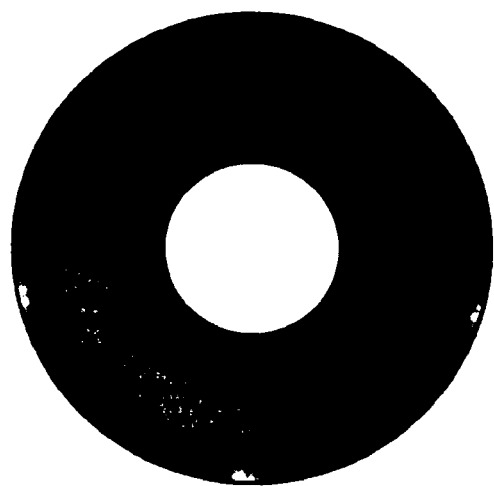
Figure 5:
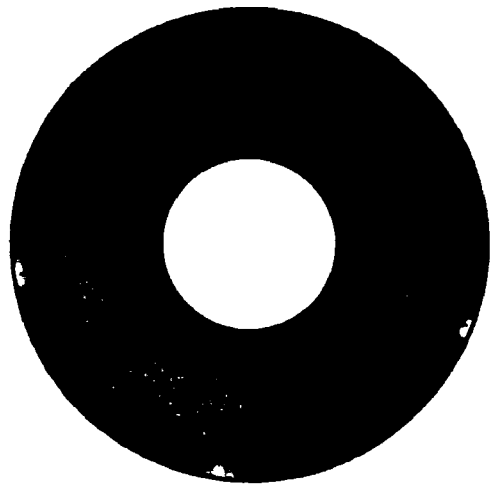

FIG. 5 shows optical HDI images of samples C (top), D (Middle) and F (bottom) listed on table II measured with p-polar channel and in phase mode display range 10. The images demonstrate that there are not obvious domain walls in the SUL.

Magnetic hysteresis loops of media C, D, and F all show radial magnetic anisotropy of the soft magnetic underlayers with easy axis along the radial directions of the discs. In the preferred embodiment, the magnetic recording layers have perpendicular anisotropy. The SUL has in-plane anisotropy, and radial easy axis direction.

Media with CoZrNb/FeCoB first and second magnetic underlayers without surface treatment of CoZrNb have similar magnetic performances and crystallographic properties with those of media with FeCoB single alloy SUL. For instance, the media similar with sample F, but without lamination of CoZrNb and without surface treatment, have FWHM of 3.13 degrees. DC noise of such media is similar with the media with laminated FeCoB SUL and with Ta spacer layers.

This application discloses several numerical range limitations that support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein in entirety by reference.

TABLE II

Coercivity and FWHM of XRD rocking curves around (0002) peaks of RuCr/Co-alloy of the media with various SUL.

| Sample ID | SUL type | CoZrNb and CoZrNbOx total thickness (nm) | FeCoB and FeCoBOx total thickness (nm) | Hc (kOe) | FWHM (degrees) |
|---|---|---|---|---|---|
| A | CoZrNbOx/CoZrNb | 180 | 0 | 5.908 | 4.84 |
| B | [CoZrNbOx]$_2$/CoZrNb | 270 | 0 | 5.865 | 5.20 |
| C | [CoZrNbOx]$_3$/CoZrNb | 360 | 0 | 5.739 | 5.41 |
| D | [FeCoBOx/Ta]$_2$/FeCoB | 0 | 240 | 5.812 | 3.14 |
| E | [CoZrNbOx]$_2$/CoZrNb/Ta/FeCoB | 270 | 54 | 5.926 | 2.89 |
| F | [CoZrNbOx]$_2$/CoZrNb/FeCoB | 270 | 54 | 6.020 | 2.87 |

The invention claimed is:

1. A perpendicular recording medium comprising:
a substrate;
a first soft magnetic underlayer and a second soft magnetic underlayer on the substrate without a spacer layer between the first and second soft magnetic underlayers; and
a magnetic recording layer, wherein the second soft magnetic underlayer is between the first soft magnetic underlayer and the magnetic recording layer, and the first soft magnetic underlayer comprises a material with an absolute value of magnetostriction constant less than $5*10^{-6}$.

2. The perpendicular recording medium of claim 1, wherein the first and second soft magnetic underlayer are directly in contact with each other.

3. The perpendicular recording medium of claim 1, wherein the substrate is shaped as a disc and the magnetic recording layer has an easy axis of magnetization directed substantially in a radial direction of the disc shaped substrate.

4. The perpendicular recording medium of claim 1, wherein the first soft magnetic underlayer comprises $CoZr_5Nb_4$ having a thickness range of 80 to 300 nm.

5. The perpendicular recording medium of claim 1, wherein the first soft magnetic underlayer material is substantially amorphous.

6. The perpendicular recording medium of claim 1, wherein the second soft magnetic underlayer material is substantially amorphous.

7. The perpendicular recording medium of claim 1, wherein at least one of the first and second soft magnetic underlayers include oxidized material.

8. The perpendicular recording medium of claim 1, wherein the second soft magnetic underlayers comprise a material, wherein the material is selected from the group consisting of Fe CoB, FeCrCoB, FeTaC, CoFeZr, CoFeTa, FeCoZrB, FeCoC, FeCoTaZr, FeCrTaC, CoFeCrZr, CoFeCrTa, FeCoCrZrB, FeCoCrC, FeCoCrTaZr, and combinations thereof.

9. The perpendicular recording medium of claim 1, wherein the first soft magnetic underlayer material is selected from the group consisting of CoZrNb, CoZrTa, and combinations thereof.

10. The perpendicular recording medium of claim 1, wherein the first and second magnetic underlayers contain substantially no stripe domains and the combined Bst of the first soft magnetic underlayer and the second soft magnetic underlayer is greater than 0.001 Gauss*Meter.

11. The perpendicular recording medium of claim 1, wherein a total thickness of the first and second soft magnetic underlayers is greater than 200 nm.

12. The perpendicular recording medium of claim 1, further comprising a third soft underlayer between the substrate and the first soft underlayer.

13. The perpendicular recording medium of claim 1, further comprising a spacer layer and a third soft underlayer between the substrate and the first soft underlayer, wherein the spacer layer is located between the first and third soft underlayers.

14. The perpendicular recording medium of claim 1, wherein the second soft magnetic underlayer comprises FeCoB.

15. The perpendicular recording medium of claim 14, wherein the first magnetic underlayer comprises at least one of CoZrNb or CoZrTa.

16. A perpendicular recording medium comprising:
a substrate;
a first soft magnetic underlayer on the substrate, the first soft magnetic underlayer comprising a material with an absolute value of magnetostriction constant less than $5*10^{-6}$;
a second soft magnetic underlayer on the first soft magnetic underlayer, the second soft magnetic underlayer comprising FeCoB; and
a magnetic recording layer, wherein the second soft magnetic underlayer is between the first soft magnetic underlayer and the magnetic recording layer, and the second soft underlayer provides a template for orienting the magnetic recording layer to have a growth direction with less than 4 degrees FWHM of XRD rocking curves around the (0002) peaks.

17. The perpendicular recording medium of claim 16, wherein the first soft magnetic underlayer comprises at least one of CoZrNb or CoZrTa.

18. The perpendicular recording medium of claim 16, wherein the first and second soft magnetic underlayers are not separated by a spacer layer.

19. A perpendicular recording medium comprising:
a substrate;
a first soft magnetic underlayer on the substrate, the first soft magnetic underlayer comprising at least one of CoZrNb or CoZrTa;
a second soft magnetic underlayer on the first soft magnetic underlayer, the second soft magnetic underlayer comprising FeCoB; and
a magnetic recording layer, the second soft magnetic underlayer between the first soft magnetic underlayer and the magnetic recording layer,
wherein the first soft magnetic underlayer has a magnetostriction constant less than $5*10^{-6}$, and
wherein the magnetic recording layer has a growth direction with less than 4 degrees FWHM of XRD rocking curves around the (0002) peaks.

20. The perpendicular recording medium of claim 19, wherein the first and second soft magnetic underlayers are not separated by a spacer layer.

21. The perpendicular recording medium of claim 1, wherein the second soft magnetic underlayer is configured to provide a template for orienting the magnetic recording layer to have a growth direction with less than 4 degrees FWHM of XRD rocking curves around the (0002) peaks.

22. The perpendicular recording medium of claim 1, wherein the first and second soft magnetic underlayers contain substantially no stripe domains.

23. The perpendicular recording medium of claim 16, wherein the first soft magnetic underlayer has a low magnetostriction constant and the second soft magnetic underlayer has a magnetostriction constant greater than the low magnetostriction constant.

24. The perpendicular recording medium of claim 16, wherein the first and second soft magnetic underlayers contain substantially no stripe domains.

* * * * *